(12) United States Patent
Modarresi et al.

(10) Patent No.: US 11,036,811 B2
(45) Date of Patent: Jun. 15, 2021

(54) CATEGORICAL DATA TRANSFORMATION AND CLUSTERING FOR MACHINE LEARNING USING DATA REPOSITORY SYSTEMS

(71) Applicant: Adobe Inc., San Jose, CA (US)

(72) Inventors: Kourosh Modarresi, Santa Clara, CA (US); Abdurrahman Ibn Munir, South Deerfield, MA (US)

(73) Assignee: Adobe Inc., San Jose, CA (US)

( * ) Notice: Subject to any disclaimer, the term of this patent is extended or adjusted under 35 U.S.C. 154(b) by 220 days.

(21) Appl. No.: 15/923,839

(22) Filed: Mar. 16, 2018

(65) Prior Publication Data

US 2019/0286747 A1    Sep. 19, 2019

(51) Int. Cl.
*G06F 16/951*    (2019.01)
*G06N 20/00*    (2019.01)

(52) U.S. Cl.
CPC ........... *G06F 16/951* (2019.01); *G06N 20/00* (2019.01)

(58) Field of Classification Search
CPC ............... G06F 16/951; G06F 16/9535; G06F 16/24578; G06F 16/248; G06N 20/00
USPC ......................................................... 707/706
See application file for complete search history.

(56) References Cited

U.S. PATENT DOCUMENTS

| | | | |
|---|---|---|---|
| 5,684,999 | A | 11/1997 | Okamoto |
| 5,867,163 | A | 2/1999 | Kurtenbach |
| 6,046,741 | A | 4/2000 | Hochmuth |
| 6,230,204 | B1 | 5/2001 | Fleming |
| 6,590,584 | B1 | 7/2003 | Yamaura et al. |
| 6,622,119 | B1 | 9/2003 | Ramaswamy et al. |
| 6,690,392 | B1 | 2/2004 | Wugoski |
| 6,757,027 | B1 | 6/2004 | Edwards et al. |
| 6,912,692 | B1 | 6/2005 | Pappas |
| 6,963,360 | B1 | 11/2005 | Esquibel et al. |
| 7,349,845 | B2 | 3/2008 | Coffman et al. |
| 7,676,145 | B2 | 3/2010 | Kuberka et al. |
| 7,739,666 | B2 | 6/2010 | Zhu et al. |
| 7,953,690 | B2 | 5/2011 | Luo et al. |
| 7,986,298 | B1 | 7/2011 | Dulaney et al. |
| 8,176,437 | B1 | 5/2012 | Taubman |
| 8,352,433 | B2 * | 1/2013 | Crescenti ............ G06F 11/1464 707/652 |
| 8,418,061 | B2 | 4/2013 | Kintzley et al. |

(Continued)

OTHER PUBLICATIONS

Bowman,"Generating Sentences from a Continuous Space", SIGNILL Conference on Computational Natural Language Learning (CONLL), 2016, May 12, 2016, 12 pages.

(Continued)

*Primary Examiner* — Hosain T Alam
*Assistant Examiner* — Nicholas E Allen
(74) *Attorney, Agent, or Firm* — FIG. 1 Patents

(57) ABSTRACT

Categorical data transformation and clustering techniques and systems are described for machine learning. These techniques and systems are configured to improve operation of a computing device to support efficient and accurate use of categorical data, which is not possible using conventional techniques. In an example, categorical data is received by a computing device that includes a categorical variable having a non-numerical data type for a number of classes. The categorical data is then converted into numerical data based on clustering used to generate a plurality of latent classes.

20 Claims, 10 Drawing Sheets

(56) References Cited

U.S. PATENT DOCUMENTS

| | | |
|---|---|---|
| 8,487,955 B2 | 7/2013 | Bala et al. |
| 8,510,328 B1 | 8/2013 | Hatton |
| 8,514,315 B2 | 8/2013 | Lee, II et al. |
| 8,627,230 B2 | 1/2014 | Boehler et al. |
| 8,751,491 B2 | 6/2014 | Fitzmaurice et al. |
| 8,913,827 B1 | 12/2014 | Fang |
| 8,943,051 B2* | 1/2015 | Fan .................. G09B 7/00 706/12 |
| 9,026,941 B1 | 5/2015 | Krueger et al. |
| 9,141,335 B2 | 9/2015 | Wilensky et al. |
| 9,262,213 B1 | 2/2016 | Gralhoz et al. |
| 9,323,996 B2 | 4/2016 | Johnson et al. |
| 9,367,526 B1 | 6/2016 | Vozila et al. |
| 9,436,382 B2 | 9/2016 | Wilensky et al. |
| 9,436,760 B1* | 9/2016 | Tacchi ............... G06F 16/3344 |
| 9,519,401 B2 | 12/2016 | Antipa |
| 9,558,278 B2 | 1/2017 | Bachman et al. |
| 9,558,428 B1 | 1/2017 | Green |
| 9,626,159 B2 | 4/2017 | Mahmud |
| 9,652,109 B2 | 5/2017 | Borzello et al. |
| 9,824,684 B2 | 11/2017 | Yu et al. |
| 9,836,484 B1 | 12/2017 | Bialynicka-Birula et al. |
| 9,986,080 B2 | 5/2018 | Velusamy et al. |
| 10,007,550 B2 | 6/2018 | Gehin |
| 10,019,134 B2 | 7/2018 | Hayasaka |
| 10,114,532 B2 | 10/2018 | Krishnaswamy et al. |
| 10,198,671 B1 | 2/2019 | Yang et al. |
| 10,275,513 B1 | 4/2019 | Cowan et al. |
| 10,346,441 B2 | 7/2019 | Lacerda et al. |
| 10,372,991 B1 | 8/2019 | Niemasik et al. |
| 10,380,493 B2 | 8/2019 | Segal |
| 10,419,585 B2 | 9/2019 | Sharma et al. |
| 10,504,010 B2 | 12/2019 | Mao et al. |
| 10,552,430 B2 | 2/2020 | Mowatt |
| 10,592,082 B2 | 3/2020 | Twist et al. |
| 10,599,701 B2 | 3/2020 | Liu et al. |
| 2003/0061201 A1* | 3/2003 | Grefenstette ........... G06F 16/38 |
| 2004/0075743 A1 | 4/2004 | Chatani et al. |
| 2005/0030387 A1 | 2/2005 | Pilu |
| 2006/0053126 A1 | 3/2006 | Baca et al. |
| 2006/0197764 A1 | 9/2006 | Yang |
| 2006/0242638 A1 | 10/2006 | Lew et al. |
| 2007/0238520 A1 | 10/2007 | Kacmarcik |
| 2008/0003547 A1 | 1/2008 | Woolfe et al. |
| 2008/0193016 A1 | 8/2008 | Lim et al. |
| 2008/0215310 A1 | 9/2008 | Audant |
| 2009/0172533 A1 | 7/2009 | Hamzaoui et al. |
| 2011/0271219 A1 | 11/2011 | Krishnan et al. |
| 2011/0288854 A1 | 11/2011 | Glass et al. |
| 2012/0032968 A1 | 2/2012 | Fan et al. |
| 2012/0054184 A1* | 3/2012 | Masud ................. G06F 16/285 707/737 |
| 2012/0299942 A1 | 11/2012 | Braun et al. |
| 2013/0159220 A1 | 6/2013 | Winn et al. |
| 2013/0159408 A1 | 6/2013 | Winn et al. |
| 2013/0346898 A1 | 12/2013 | Kokemohr |
| 2014/0078075 A1 | 3/2014 | Wilensky et al. |
| 2014/0082500 A1 | 3/2014 | Wilensky et al. |
| 2014/0143251 A1* | 5/2014 | Wang ................. G06F 16/285 707/737 |
| 2014/0156567 A1* | 6/2014 | Scholtes ............... G06N 5/02 706/12 |
| 2015/0007065 A1 | 1/2015 | Krishnamoorthy et al. |
| 2015/0067701 A1 | 3/2015 | VanBlon et al. |
| 2015/0081703 A1 | 3/2015 | Murphy-Chutorian et al. |
| 2015/0086091 A1 | 3/2015 | Rezaee et al. |
| 2015/0098646 A1 | 4/2015 | Paris et al. |
| 2015/0120732 A1* | 4/2015 | Nemery De Bellevaux ................ G06F 16/904 707/737 |
| 2015/0185995 A1 | 7/2015 | Shoemaker et al. |
| 2015/0347926 A1* | 12/2015 | Fuchs ................ G06N 7/005 706/12 |
| 2015/0379428 A1* | 12/2015 | Dirac .................. G06N 20/00 706/12 |
| 2015/0379429 A1* | 12/2015 | Lee .................... G09B 5/00 706/11 |
| 2016/0019460 A1 | 1/2016 | Li |
| 2016/0078361 A1* | 3/2016 | Brueckner ............ H04L 67/10 706/12 |
| 2016/0098519 A1* | 4/2016 | Zwir .................. G16B 20/00 702/19 |
| 2016/0104057 A1 | 4/2016 | Shen et al. |
| 2016/0110433 A1* | 4/2016 | Sawhney ............. G06F 40/30 707/722 |
| 2016/0110442 A1* | 4/2016 | Williams ........... G06Q 10/0637 707/737 |
| 2016/0127641 A1 | 5/2016 | Gove |
| 2016/0180235 A1 | 6/2016 | Sabah et al. |
| 2016/0203386 A1 | 7/2016 | Porecki et al. |
| 2016/0247064 A1 | 8/2016 | Yoo et al. |
| 2016/0360336 A1 | 12/2016 | Gross et al. |
| 2016/0365114 A1 | 12/2016 | Galant et al. |
| 2016/0379132 A1* | 12/2016 | Jin .................... H04L 67/22 706/12 |
| 2017/0060986 A1* | 3/2017 | Ideses .................. G06F 17/212 |
| 2017/0097948 A1 | 4/2017 | Kerr et al. |
| 2017/0098152 A1 | 4/2017 | Kerr et al. |
| 2017/0123631 A1 | 5/2017 | Sharma et al. |
| 2017/0147910 A1 | 5/2017 | Mao et al. |
| 2017/0161651 A1 | 6/2017 | Demarchi et al. |
| 2017/0171580 A1* | 6/2017 | Hirsch ............... H04N 21/6125 |
| 2017/0213130 A1 | 7/2017 | Khatri et al. |
| 2017/0249549 A1 | 8/2017 | Bai |
| 2017/0255655 A1 | 9/2017 | Collier et al. |
| 2017/0278015 A1* | 9/2017 | Miranda ............... G06N 20/00 |
| 2017/0293356 A1* | 10/2017 | Khaderi .............. A61B 3/024 |
| 2017/0293842 A1* | 10/2017 | Buchanan ........... G06N 5/022 |
| 2017/0308613 A1* | 10/2017 | Zhu .................... G06F 16/9535 |
| 2017/0344899 A1* | 11/2017 | Zimmerman ......... G06N 20/00 |
| 2017/0374178 A1 | 12/2017 | Sharma et al. |
| 2018/0032874 A1* | 2/2018 | Sanchez Charles .. G06F 16/367 |
| 2018/0032882 A1 | 2/2018 | Joshi et al. |
| 2018/0046920 A1 | 2/2018 | Yang et al. |
| 2018/0060736 A1* | 3/2018 | Brewer ................ G06N 5/022 |
| 2018/0068083 A1* | 3/2018 | Cohen .................. G16H 50/30 |
| 2018/0075128 A1 | 3/2018 | Srinivasan et al. |
| 2018/0089799 A1 | 3/2018 | Johnson et al. |
| 2018/0101506 A1 | 4/2018 | Hodaei et al. |
| 2018/0113780 A1 | 4/2018 | Kim et al. |
| 2018/0129899 A1 | 5/2018 | Harron et al. |
| 2018/0144126 A1 | 5/2018 | Swinke et al. |
| 2018/0189269 A1 | 7/2018 | Quirk et al. |
| 2018/0192082 A1 | 7/2018 | O'Driscoll et al. |
| 2018/0225812 A1 | 8/2018 | DiVerdi et al. |
| 2018/0260698 A1 | 9/2018 | Lin et al. |
| 2018/0260718 A1 | 9/2018 | Biswas et al. |
| 2018/0268337 A1 | 9/2018 | Miller et al. |
| 2018/0268548 A1 | 9/2018 | Lin et al. |
| 2018/0307670 A1 | 10/2018 | Hicks et al. |
| 2018/0336415 A1 | 11/2018 | Anorga et al. |
| 2018/0357321 A1 | 12/2018 | Cheng et al. |
| 2018/0359199 A1 | 12/2018 | Nguyen et al. |
| 2019/0005090 A1 | 1/2019 | Zhang et al. |
| 2019/0043074 A1 | 2/2019 | Peysakhovich et al. |
| 2019/0043075 A1 | 2/2019 | Peysakhovich et al. |
| 2019/0050392 A1 | 2/2019 | Clements et al. |
| 2019/0068526 A1 | 2/2019 | Xie et al. |
| 2019/0140995 A1 | 5/2019 | Roller et al. |
| 2019/0147231 A1 | 5/2019 | Kim et al. |
| 2019/0228273 A1 | 7/2019 | Merrill et al. |
| 2019/0258498 A1 | 8/2019 | Chandan et al. |
| 2019/0278844 A1 | 9/2019 | Brixey et al. |

OTHER PUBLICATIONS

Chelba, "N-gram Language Modeling using Recurrent Neural Network Estimation", Jun. 20, 2017, 10 pages.

Dieng, "TopicRNN: A Recurrent Neural Network with Long-Range Semantic Dependency", Feb. 27, 2017, 13 pages.

(56) References Cited

OTHER PUBLICATIONS

Logeswaran, "Sentence Ordering using Recurrent Neural Networks", Nov. 8, 2016, 15 pages.
Oshri, "There and Back Again: Autoencoders for Textual Reconstruction", Retrieved at: https://www.semanticscholar.org/paper/There-and-Back-Again-Autoencoders-for-Textual-Reco-Oshri-Khandwala/ce4c4564dd9f05720673cd9234571ae992f92048?tab=abstract—on Nov. 17, 2017, 9 pages.
Palangi, "Deep Sentence Embedding Using Long Short-Term Memory Networks: Analysis and Application to Information Retrieval", EEE/ACM Transactions on Audio, Speech, and Language Processing, Jan. 16, 2016, 25 pages.
Shi, "RNN language model with word clustering and class-based output layer", Jul. 22, 2013, 7 pages.
Sporleder, "Automatic Paragraph Identification: A Study across Languages and Domains", Jan. 1, 2004, 8 pages.
Sutskever, "Sequence to Sequence Learning with Neural Networks", in Advances in neural information processing systems, 2014., Dec. 14, 2014, 9 pages.
"First Action Interview Office Action", U.S. Appl. No. 15/898,456, dated Apr. 2, 2020, 16 pages.
"Pre-Interview First Office Action", U.S. Appl. No. 15/898,456, dated Feb. 6, 2020, 17 pages.
"Final Office Action", U.S. Appl. No. 15/898,456, dated May 28, 2020, 16 pages.
"Notice of Allowance", U.S. Appl. No. 15/898,456, dated Aug. 25, 2020, 7 pages.
"Notice of Allowance" issued in U.S. Appl. No. 15/898,456, dated Sep. 3, 2020, 3 pages.

\* cited by examiner

900

First Cluster 902
Broccoli, Cabbage, Celery, Cauliflower, Green bean, Okra, Cardoon, Celery, Daikon

Second Cluster 904
Beetroot, Garlic, Leek, Onion, Shallot, Carrot, Jerusalem artichoke, Potato, Rutabaga, Sweet potato, Taro

Third Cluster 906
Watercress, Nori

Fourth Cluster 908
Chicory, Endive, Artichoke, Kohlrabi, Turnip

Fifth Cluster 910
Bok choy, Collard greens, Komatsuna, Lettuce, Rapini, Spinach, Asparagus, Chives, Bamboo shoot

Sixth Cluster 912
Amaranth, Pea, Radicchio, Black-eyed pea, Chickpea, Lentil, Mung bean, Snap pea, Wakame

Fig. 9

CATEGORICAL DATA TRANSFORMATION AND CLUSTERING FOR MACHINE LEARNING USING DATA REPOSITORY SYSTEMS

BACKGROUND

Artificial intelligence and machine learning techniques used by a computing device employ mathematical models trained from training data to support a variety of functionality, such to generate recommendations and control output of digital marketing content. In some instances, the data employed to train and use these models by the computing device is of a mixed data type that includes both numerical (e.g., continuous) data and categorical data that is non-numerical, i.e., alphabetical. However, many machine learning techniques are typically limited to accepting numerical data as an input. Accordingly, standardization of categorical data into numerical data is a crucial step as part of training and use of models as part of machine learning.

However, conventional techniques used to perform standardization of categorical data often fail and thus hinder operation of the computing device to perform machine learning. In one conventional example, dummy variables are used for the categorical data that assume only one of two values, e.g., one and zero in which one means a subject has the value of that variable and zero indicates it does not. In practice, however, when the number of classes or categories, for any variable, are large, this may lead to the "curse of dimensionality" that may lead to misleading results when used as part of machine learning due to discovery of false patterns based on noise or random chance due to the multitude of categories included. For example, categorical data having a categorical variable of "country of residence" may have over one hundred and seventy different classes. As a result, conventional machine learning techniques could not address these categories and thus could not avail themselves of this potentially insightful information and further hindered operation of a computing device that employs these techniques.

SUMMARY

Categorical data transformation and clustering techniques and systems are described for machine learning. These techniques and systems are configured to improve operation of a computing device to support efficient and accurate use of categorical data, which is not possible using conventional techniques. In an example, categorical data is received by a computing device that includes a categorical variable having a non-numerical data type for a number of classes. The categorical variable, for instance, may be "City of Residence" that may have thousands of classes for the U.S., alone, and millions of classes for the world.

Descriptive data is obtained by the computing device that describes features of the classes of the categorical variable. The computing device, for instance, may perform a "web scrape" of a website such as Wikipedia® to obtain descriptive data that describes features of the categorical variable, such as population, land size, and so forth for a categorical value "cities." The descriptive data is then clustered (e.g., using K-means clustering) by the computing device to generate latent classes as clusters of the descriptive data. These clusters, and corresponding latent classes, may then be used to convert a non-numerical data type into numerical data, e.g., by replacing cities with a numerical value of a cluster, to which, the class of the categorical variable is assigned. In this way, the techniques described herein may support efficient processing of categorical data, which is not possible using conventional techniques.

This Summary introduces a selection of concepts in a simplified form that are further described below in the Detailed Description. As such, this Summary is not intended to identify essential features of the claimed subject matter, nor is it intended to be used as an aid in determining the scope of the claimed subject matter.

BRIEF DESCRIPTION OF THE DRAWINGS

The detailed description is described with reference to the accompanying figures. Entities represented in the figures may be indicative of one or more entities and thus reference may be made interchangeably to single or plural forms of the entities in the discussion.

FIGS. 6-9 depict examples of clusters formed using a Silhouette technique.

DETAILED DESCRIPTION

Overview

Figure 1:
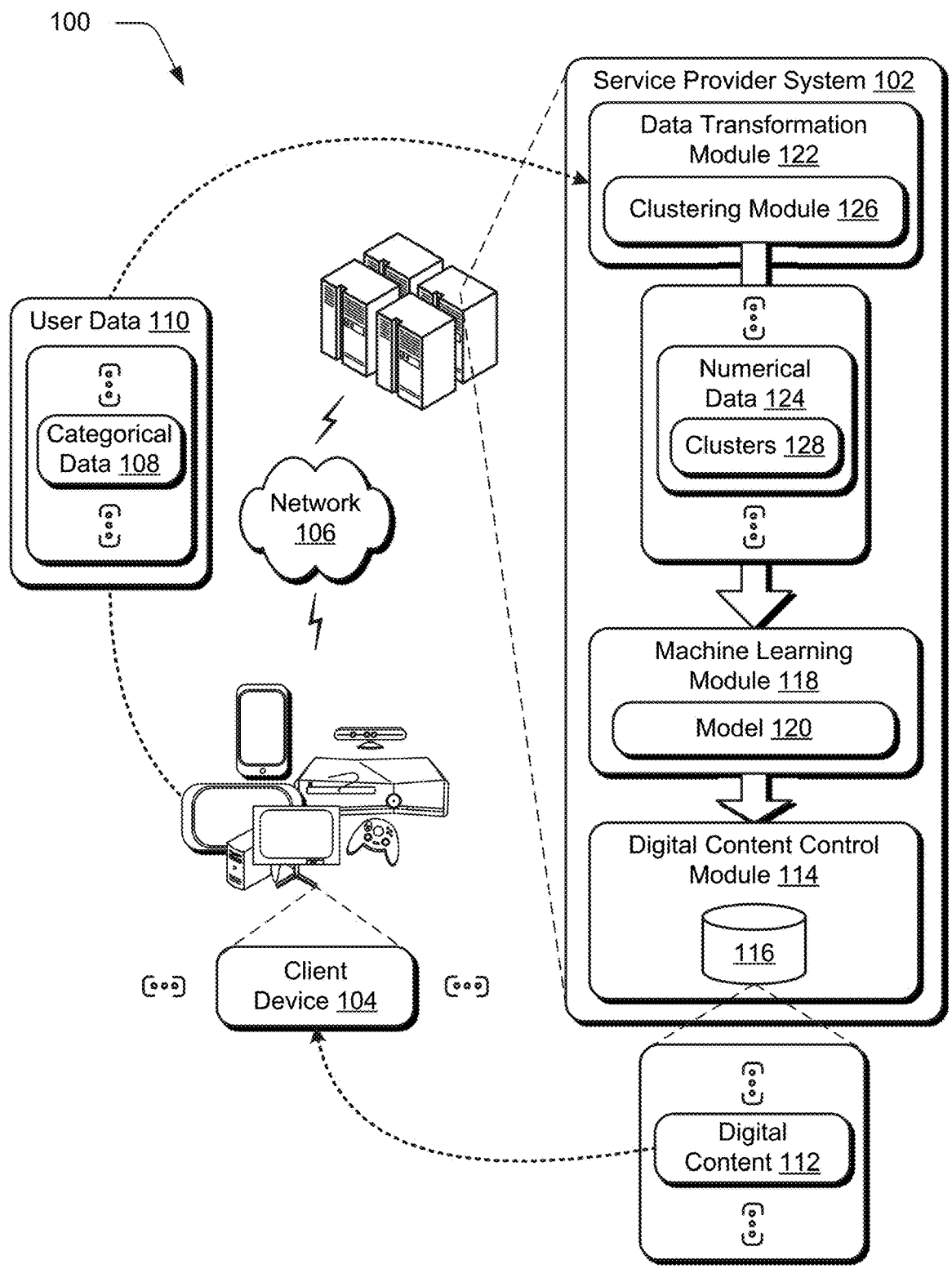
FIG. 1 is an illustration of an environment in an example implementation that is operable to employ techniques described herein.

Artificial intelligence and machine learning techniques employed by a computing device are typically limited to use of numerical data. However, in practice data may also be categorical. Categorical data is a non-numerical form of data having a categorical variable that includes multiple classes, the values of which are defined using at least some alphabetical characters. For example, a mixed data type may include numerical data such as "age" and "income" as well as categorical data such as "marital status" that is to be used as a basis to generate digital content recommendations by a computing device.

To perform machine learning, categorical data is first converted by the computing device to numerical data. Conventional techniques to do so, however, often fail due to what is referred to as the "curse of dimensionality." In order to convert a categorical variable of "marital status," for instance, there may be three classes (e.g., married, not married, divorced) and thus two new dummy variables, e.g., a "0" or "1" for married and "0" or "1" for divorced to cover the three options. Thus, in general for any categorical variable of "m" classes, "m−1" dummy variables are created in conventional techniques.

The problem arises, however, when the categorical variable includes a relatively large number of classes, which has been found in practice to be over ten. The reason is, that in this scenario the number of dummy variables that are to be created becomes too large, causing the data to become of high dimension. High dimensionality of the data leads to a "curse of dimensionality" problem resulting from an exponential increase in the number of dummy variables. This results in corresponding difficulties in distance computation based on these dummy variables (e.g., to determine similarity), thereby hindering operation of the computing device from being able to process this data using machine learning.

The curse of dimensionality, for instance, may lead to misleading results from machine learning models by finding false patterns based on noise or random chance in the categorical data. For example, consider categorical data having a large number of classes for a categorical variable such as "City of Residence." In this example there are potentially thousands of classes for just the U.S. alone and millions for the world. Thus, conventional techniques are not able to address this data as the sheer multitude of classes hindered operation of the computing device from achieving an accurate result due to noise and possible random chance. Another difficulty resulting from high dimensionality of data is high computational cost of using any machine learning or AI models.

Accordingly, categorical data transformation techniques and systems are described for machine learning. These techniques and systems are configured to improve operation of a computing device to support efficient and accurate use of categorical data as part of machine learning and may do so in real time, which is not possible in conventional systems as described above.

To begin, categorical data is received by a data transformation module of a computing device. The categorical data is then transformed into numerical data by the data transformation module. To do so, the data transformation module obtains descriptive data that describes features of the classes of the categorical variable. For a categorical variable "State of Residence," for instance, the data transformation module may obtain descriptive data that describes features of each state, e.g., population, size, and so forth.

This descriptive data is clustered by the data transformation module to identify a number of latent classes, e.g., ten, that is less than a number of classes of the semantic variable, e.g., fifty. Thus, the number of latent classes is equal to the number of clusters, which is a fraction of the number of dummy variables used in the conventional techniques described above. This acts to reduce the number of classes, and thus dimensionality of the numerical data, to a smaller number of latent classes e.g., through K-means clustering. In this way, the categorical data may be converted into numerical data based on membership of the classes to respective clusters, which are associated with the number. For example, categorical data for a state of residence "California" may be assigned a numerical value based on which cluster, and corresponding latent class, includes this state.

The numerical data based on the latent classes is then provided as an input to a machine learning model to perform machine learning, e.g., to train the model or for use by a trained model to generate a result such as a recommendation or control output of digital marketing content. Thus, clustering of the numerical data acts to lower dimensionality to a smaller number of "latent classes" that are the underpinning classes of the categorical data. This acts to avoid high dimensionality and yet retain information within the categories as latent classes that is considered useful to support any machine learning technique. Examples of types of machine learning that may leverage these features include support vector machines, linear regression, logistic regression, dimensionality reduction algorithms, artificial neural networks, deep learning, Poisson regression, linear discriminant analysis (LDA), and so forth.

In this way, the clustering techniques described herein improve operation of a computing device to enable machine learning to be performed using categorical data. This enables the computing device to avoid operational inaccuracies of conventional techniques encountered as part of conventional techniques that are not capable of avoiding the "curse of dimensionality" that leads to potentially misleading results through detection of false patterns discovered based on noise or random chance. Further discussion of these and other examples is included in the following sections.

Term Examples

"Categorical data" includes a categorical variable having a non-numerical form that includes multiple classes, the values of which are defined using at least some alphabetical characters. "Numerical data" is expressed solely using numerical characters, whereas categorical data may be expressed using alphabetical and numerical characters. For example, a mixed data type may include numerical data such as "age" and "income" as well as categorical data such as "marital status" that is to be used as a basis to generate digital content recommendations by a computing device.

As used herein, the term "model" as used in reference to "machine learning" refers to a computer representation that can be tuned (e.g., trained) based on inputs to approximate unknown functions. In particular, the model can include a model that utilizes algorithms to learn from, and make predictions on, known data by analyzing the known data to learn to generate outputs that reflect patterns and attributes of the known data. For instance, a model used as part of machine learning can include but is not limited to, support vector machines, linear regression, logistic regression, Bayesian networks, dimensionality reduction algorithms, artificial neural networks, deep learning, Poisson regression, linear discriminant analysis (LDA), and so forth. Thus, a model is used as part of machine learning to make high-level abstractions in data by generating data-driven predictions or decisions from the known input data.

"Real time" refers to processing of input data by a computing device within milliseconds so that the processed data is output as experienced by a user to appear as immediate feedback. "Real time distribution" involves communication of digital content in real time, e.g., transmission by a computing device for viewing by a user and/or receipt by another computing device.

"Digital content" refers to a variety of different types of digital content, such as images, video, sound, and so on. Accordingly, digital content may be created to describe a variety of visual, audio, and/or haptic characteristics, such as objects to be included in an image, general look and feel of the image, types of sounds to be included in sound, locations for capture of video, haptic feedback, and so forth.

"Digital marketing content" is typically provided to users in order to increase a likelihood that a user will interact with the content or another item of digital marketing content toward purchase of a product or service, which is also referred to as conversion. In one example of use of digital marketing content and conversion, a user may navigate through webpages of a website of a service provider. During this navigation, the user is exposed to advertisements relating to the good or service. If the advertisements are of interest to the user, the user may select the advertisement to navigate to webpages that contain more information about the product or service that is a subject of the advertisement, functionality usable to purchase the good or service, and so forth. Each of these selections thus involves conversion of interaction of the user with respective digital marketing content into other interactions with other digital marketing content and/or even purchase of the good or service. Thus, configuration of the advertisements in a manner that is likely to be of interest to the users increases the likelihood of conversion of the users regarding the product or service.

In the following discussion, an example environment is first described that may employ the techniques described herein. Example procedures are then described which may be performed in the example environment as well as other environments. Consequently, performance of the example procedures is not limited to the example environment and the example environment is not limited to performance of the example procedures.

Example Environment

FIG. 1 is an illustration of a digital medium environment 100 in an example implementation that is operable to employ techniques described herein. The illustrated environment 100 includes a service provider system 102 communicatively coupled to a plurality of client devices 104 via a network 106. Computing devices that implement the service provider system 102 and client device 104 may be configured in a variety of ways.

A computing device, for instance, may be configured as a desktop computer, a laptop computer, a mobile device (e.g., assuming a handheld configuration such as a tablet or mobile phone), and so forth. Thus, a computing device may range from full resource devices with substantial memory and processor resources (e.g., personal computers, game consoles) to a low-resource device with limited memory and/or processing resources (e.g., mobile devices). Additionally, a computing device may be representative of a plurality of different devices, such as multiple servers utilized by a business to perform operations "over the cloud" as described in FIG. 10 and shown for the service provider system 102.

In this example, categorical data 108 is illustrated as being provided by the client device 104 to the service provider system 102 via the network 106 as part of user data 110. Categorical data 108 is a type of non-numerical data that includes a categorical variable having classes that are specified at least partially using alphabetical characters to describe the classes. For a categorical variable "occupation," for instance, classes that describe potential values for the occupation category include "engineer," "lawyer," "doctor," and so forth and thus use alphabetical characters. Thus, the user data 110 in this example includes categorical data 108 that is usable to describe characteristics of users of the client device 104 and/or the client device 104, itself. Categorical data may also include numbers along with alphabetic characters, an example of which includes a rating.

This may be used, for instance, to control output of digital content 112 by a digital content control module 114 of the service provider system 102 to the client device 104. The digital content 112 is illustrated as stored in a storage device 116, e.g., a computer-readable storage medium. The digital content control module 114, for instance, may output the digital content 112 as recommendations, as digital marketing content to influence conversion of a good or service by a user of the client device 104, and so on for communication via the network 106 to the client device 104.

In order to control which items of digital content 112 are to be output to the client device 104 in this example, a machine learning module 118 employs a model 120 that is configured to process the user data 110. The machine learning module 118, for instance, may train the model 120 using training data that describes characteristics of users, digital content exposed to the users, and a result of actions taken by the users, e.g., conversion of a good or service. The model 120, as part of training, is used to predict user actions based on the training data and then compare those predictions with a result in the training data.

A loss function is then used to determine a measure of loss (i.e., a measure of difference such as a mean square error or mean absolute loss) and propagate this measure back through the model 120 (e.g., layers in a neural network) to correct parameters that caused errors in the prediction, e.g., to set different weights. In this way, the model 120 may employ the loss function to learn through processing of the training data. Once trained, the model 120 may then be used in this instance to process user data 110 to control which items of digital content 112 are to be output to the client device 104, e.g., digital marketing content, content recommendations, and so forth. Other instances are also contemplated of use of the machine learning module 118 that do not involve control of digital content 112 output.

As previously described, the machine learning module 118 and model 120 are typically configured to accept numerical data. However, in practice, categorical data 108 is often also included as part of data to be processed by the model 120, e.g., user data 110 in this example. The user data 110, for instance, may include numerical data such as "age" as well as categorical data such as "city of residence." Accordingly, the service provider system 102 in this example is configured to employ a data transformation module 122 to transform the categorical data 108 into numerical data 124 that is acceptable for processing by the model 120 as part of machine learning.

However, scenarios exist in practice in which the categorical data 108 includes hundreds, thousands, and even millions of potential classes for a categorical variable, which may lead to the "curse of dimensionality" problem, when converted to numerical variables using conventional techniques, as previously described. For example, in practice it has been found that instances in which a categorical variable includes more than ten classes causes machine learning techniques to produce results that have limited accuracy and thus meaning because the number of classes is too much. Thus, the number of newly created numerical dummy variables are also too large for a numerical model to handle as part of machine learning as implemented by a computing device.

To address this, the data transformation module 122 also employs a clustering module 126 to generate latent classes from the numerical data by forming clusters 128, e.g., using K-means clustering, Silhouette model, and so forth. The clustering module 126 is thus configured to reduce a number of classes in the categorical data 108 (e.g., from more than ten to less than ten) to form a smaller number of "latent classes" that are the underpinning classes for the original classes of the categorical data 108. In this way, the high dimensionality of conventional techniques is avoided. Yet still, the latent classes formed from the clusters 128 may be used to retain information usable for processing by the machine learning module 118 in a form that is acceptable by the model 120, further discussion of which is included in the following section and shown in corresponding figures.

In general, functionality, features, and concepts described in relation to the examples above and below may be employed in the context of the example procedures described in this section. Further, functionality, features, and concepts described in relation to different figures and examples in this document may be interchanged among one another and are not limited to implementation in the context of a particular figure or procedure. Moreover, blocks associated with different representative procedures and corresponding figures herein may be applied together and/or combined in different ways. Thus, individual functionality, features, and concepts described in relation to different example environments, devices, components, figures, and procedures herein may be used in any suitable combinations and are not limited to the particular combinations represented by the enumerated examples in this description.

Categorical Data Transformation and Clustering

Figure 2:
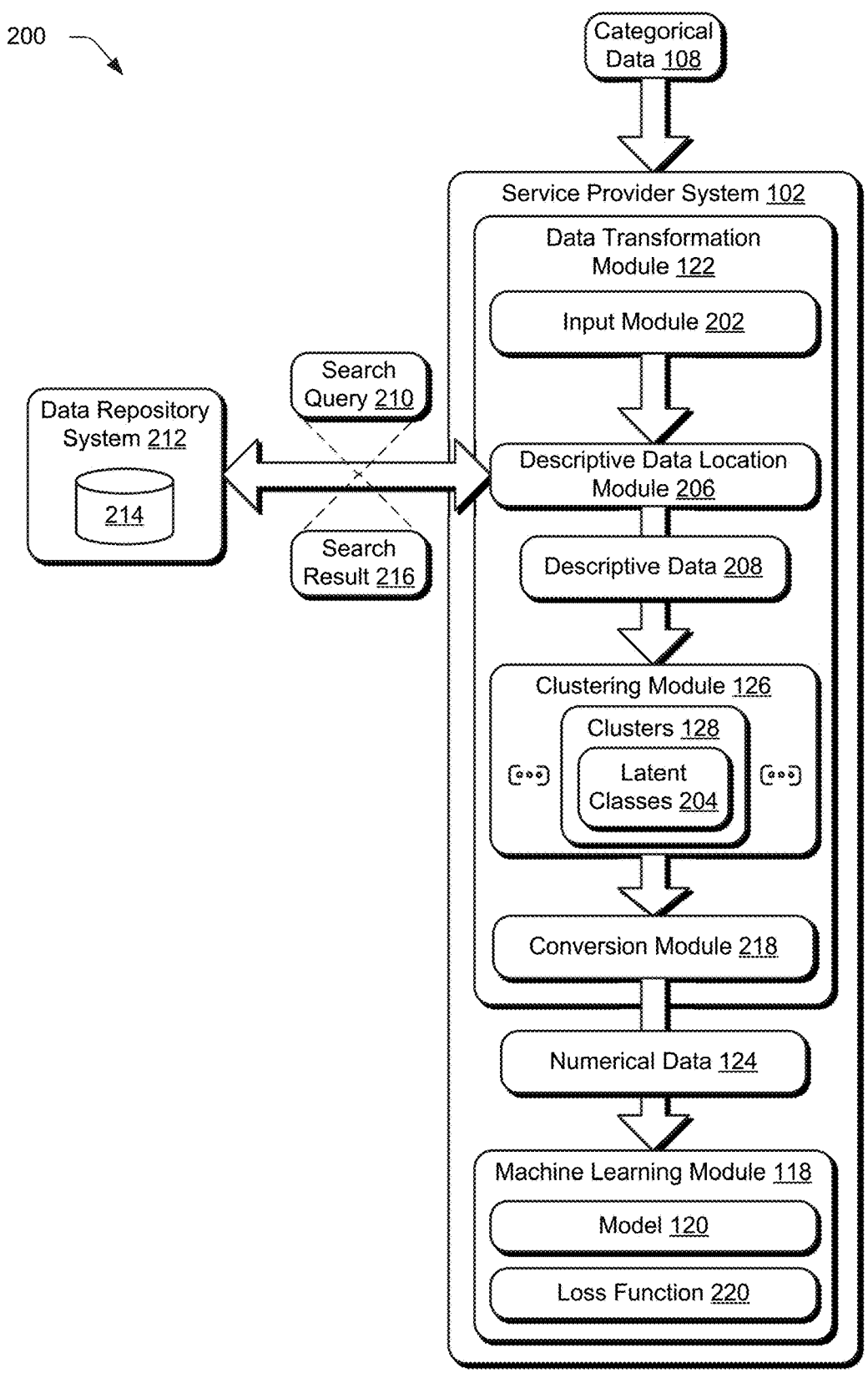
FIG. 2 depicts a system in an example implementation showing operation of a data transformation module and clustering module of FIG. 1 to process categorical data into a form that is acceptable for machine learning to train a model.
Figure 3:
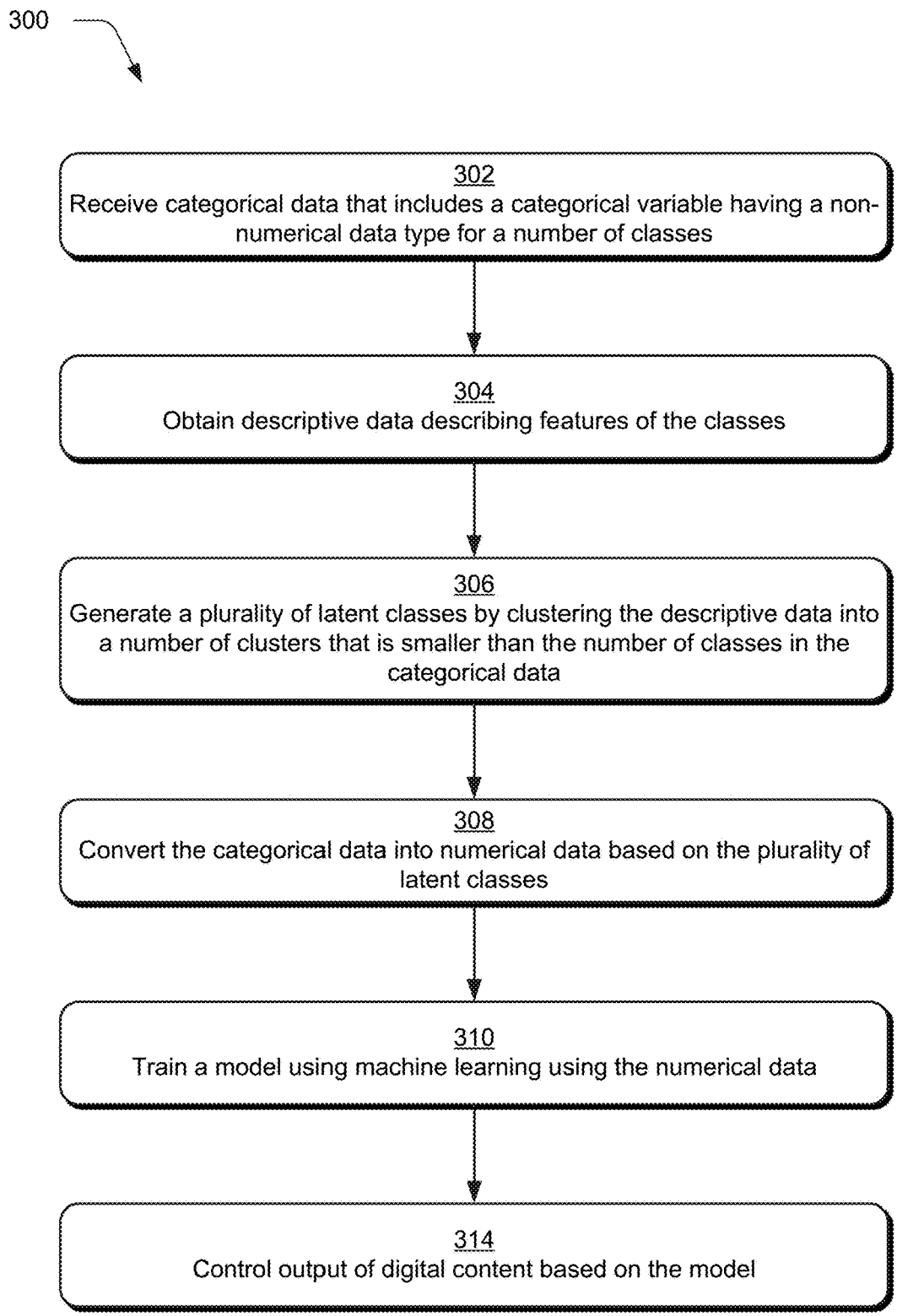
FIG. 3 is a flow diagram depicting a procedure in an example implementation of categorical data conversion into numerical data based on clustering of descriptive data.
Figure 4:
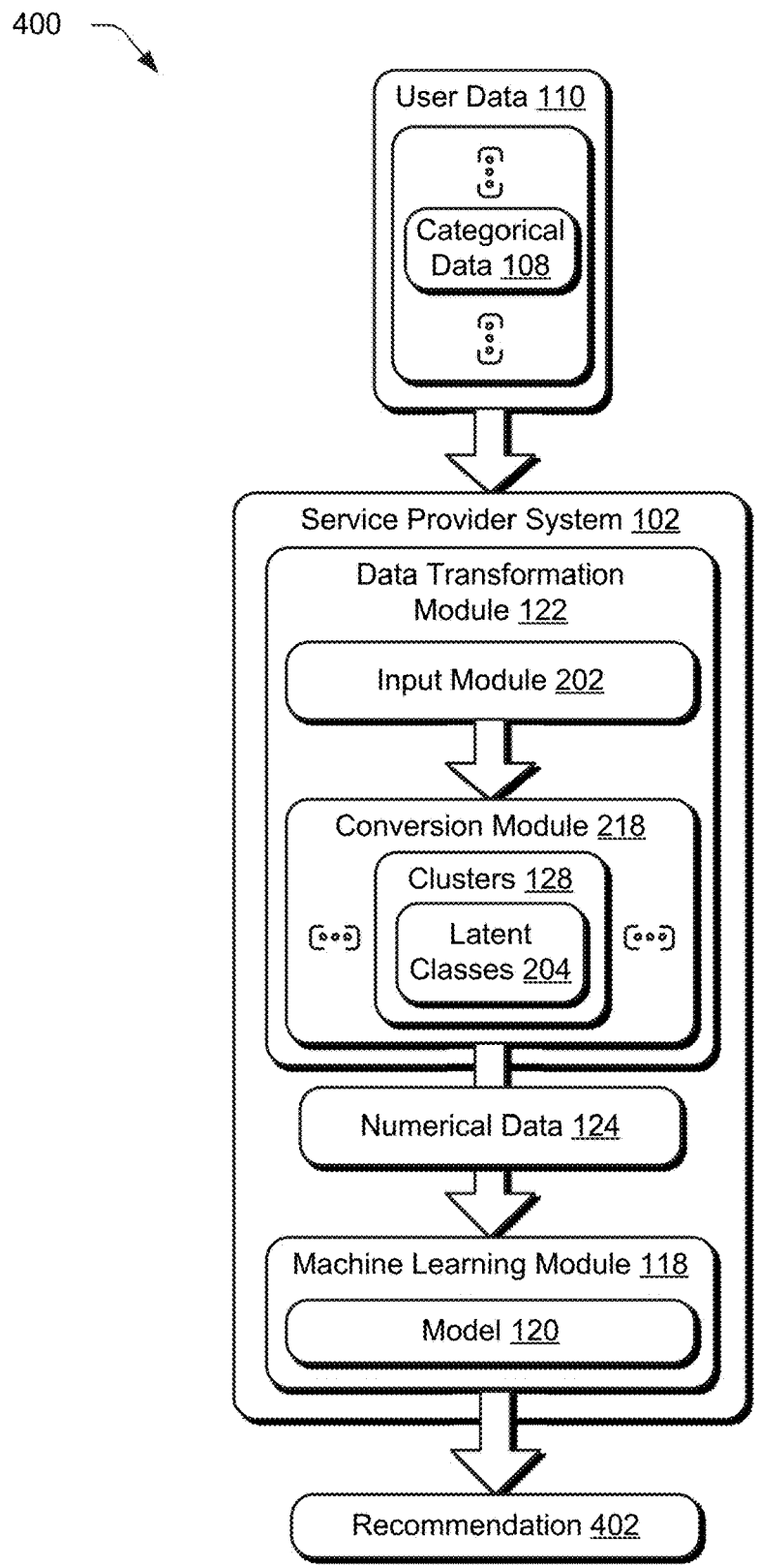
FIG. 4 depicts a system in an example implementation of use of the trained model of FIG. 2 to generate a recommendation.
Figure 5:
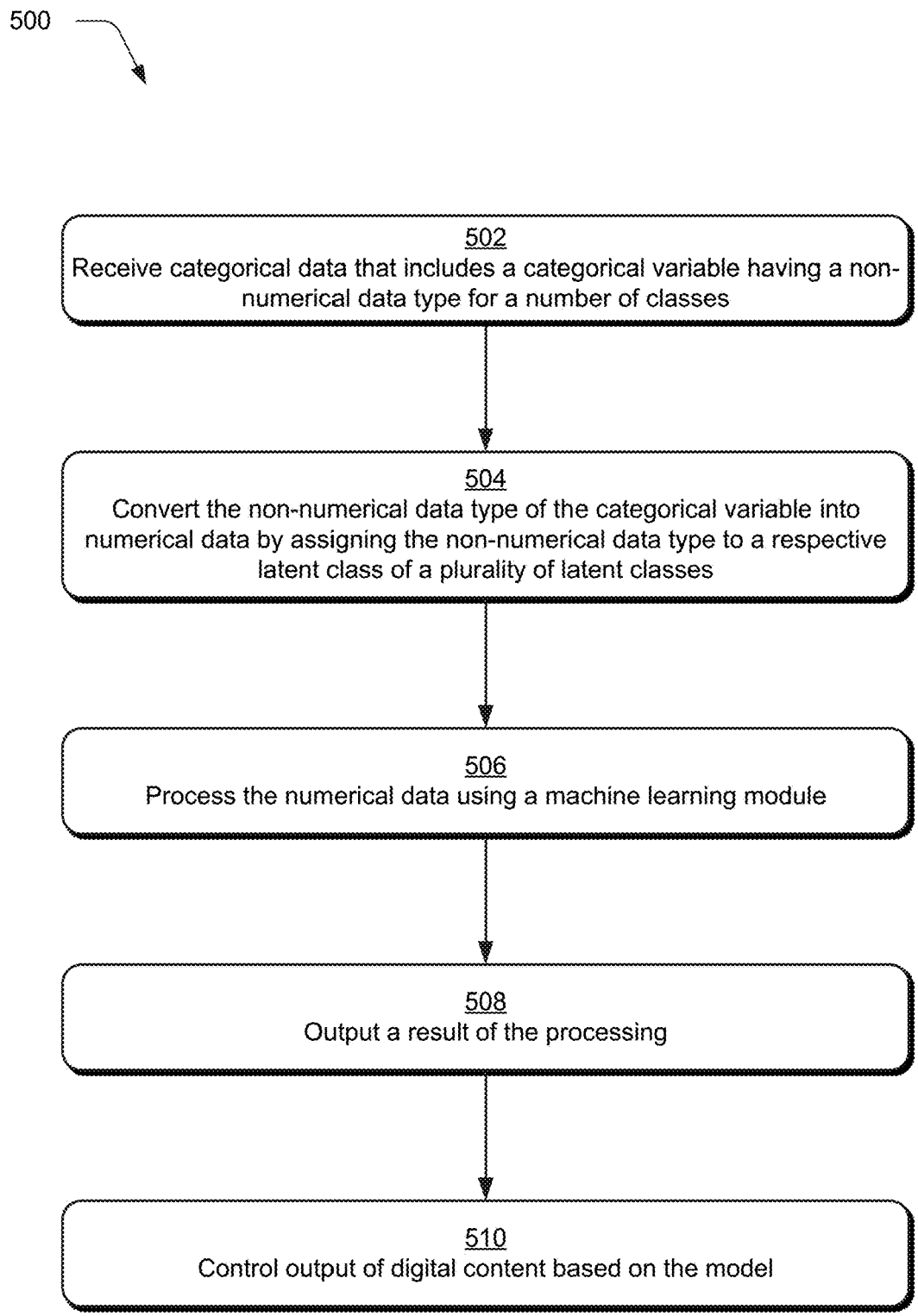
FIG. 5 is a flow diagram depicting a procedure in an example implementation in which categorical data is converted into numerical data based on cluster assignments to generate a recommendation.

FIG. 2 depicts a system 200 in an example implementation showing operation of the data transformation module 122 and clustering module 126 of FIG. 1 to process categorical data into a form that is acceptable for machine learning to train a model. FIG. 3 depicts a procedure 300 in an example implementation of categorical data conversion into numerical data based on clustering of descriptive data. FIG. 4 depicts a system 400 in an example implementation of use of the trained model of FIG. 2 to generate a recommendation. FIG. 5 depicts a procedure 500 in an example implementation in which categorical data is converted into numerical data based on cluster assignments to generate a recommendation. FIGS. 6-9 depict examples 600, 700, 800, 900 of clusters formed using a Silhouette technique.

The following discussion describes techniques that may be implemented utilizing the previously described systems and devices. Aspects of each of the procedures may be implemented in hardware, firmware, software, or a combination thereof. The procedures are shown as a set of blocks that specify operations performed by one or more devices and are not necessarily limited to the orders shown for performing the operations by the respective blocks. In portions of the following discussion, reference is made interchangeably to FIGS. 1-9.

To begin, categorical data 108 is received by an input module 202 of the service provider system 102 that includes a categorical variable having a non-numerical data type for a number of classes (block 302). The categorical data 108, for instance, includes alphabetical characters and may also include numeric characters in addition to the alphabetic characters, i.e., is not limited to exclusive use of alphabetical characters.

The data transformation module 122 is configured to transform the categorical data 108 into a form (e.g., from a non-numerical data type to a numerical data type) that is acceptable by the machine learning module 118 and yet also includes useful information that increases accuracy of the machine learning module 118 and corresponding model 120 as opposed to conventional techniques. As previously described, a categorical variable that includes more than ten classes (i.e., unique values for the variable) has been found in practice to cause machine learning models to not function properly due to the curse of dimensionality, resulting from creating a large number of new dummy variable when transforming the categorical variables to numerical ones, which may introduce errors based on random chance and noise. Accordingly, the data transformation module 122 is configured to generate latent classes 204 by forming clusters 128 of classes of the categorical variable to maintain useful information in a form that is acceptable by the machine learning module 118 to train and use the model 120, e.g., less than ten latent classes.

In order to determine which classes are to be included in which cluster 128, the data transformation module 122 employs a descriptive data location module 206. The descriptive data location module 206 is configured to obtain descriptive data 208 that describes features of multiple classes of a categorical variable in the categorical data 108 (block 304). The descriptive data location module 206, for instance, may receive a user input that identifies features of categorical variable for the multiple classes. For a categorical variable "city of origin," for instance, the descriptive data location module 206 may obtain a user input indicating features of "population," "average temperature," "birth rate," "mortality rate," "surface area," and "forest area" are to be used as a basis to determine similarity of the classes to each other. In this way, the features describe characteristics of respective classes of the categorical variable. Other examples are also contemplated, such as to select the features from the descriptive data 208, once obtained.

In the illustrated example, the descriptive data location module 206 forms a search query 210 that is communicated via a network 106 to a data repository system 212. The data repository system 212 includes a storage device 214 containing a corpus of data that includes values for the features for the multiple classes. The data repository system 212, for instance, may be made accessible via a search engine or publicly accessible data such as Wikipedia®. The data repository system 212 in this example performs a search based on the search query 210 (e.g., the features and classes) and generates a search result 216 that is received by the descriptive data location module 206 as the descriptive data 208. Other examples are also contemplated, including a data repository system 212 that is maintained locally at the service provider system 102.

The descriptive data 208 is then passed to a conversion module 218. The conversion module 218 is configured to generate a plurality of latent classes 204 by clustering the descriptive data 208 into a number of clusters 128 (block 306). This clustering may be performed in a variety of ways. Inhere, for clustering the descriptive data 208, K-means model is used and to determine the number of clusters, in addition to clustering validation, a Silhouette technique is used. The Silhouette technique involves interpretation and validation of consistency within clusters 128 of data. Thus, the Silhouette technique is usable to determine "how well" each item in the cluster 128 (i.e., values of the features in the descriptive data 208) fits within the cluster 128 both in relation to that cluster as well as other clusters. Silhouette is based on a measure of how similar an item in the cluster 128 is to other items in the cluster, which is referred to as cohesion. This is also based on a measure of how dissimilar the item in the cluster 128 is to other items, which is referred to as separation. This may be expressed mathematically as follows:

$$s(i) = \frac{b(i) - a(i)}{\max\{a(i), b(i)\}}$$

In the above expression, the variable "b(i)" denotes a lowest average dissimilarity of data point "i" to any other cluster 128, of which "i" is not a member. The cluster with this lowest average dissimilarity is referred to as a neighboring cluster 128 of "i" because it is the next best fit cluster for item "i". For "s(i)" to be close to one, "a(i)<<b(i)", as "a(i)" is a measure of how dissimilar "i" is to its own cluster, with a small value indicative of a good match.

Furthermore, a large value of "b(i)" implies that "i" is badly matched to its neighboring cluster 128. Thus, a value of "s(i)" that is close to one means that the data 208 is accurately clustered. On the other hand, if "s(i)" is close to negative one, then "i" is to be clustered in a neighboring cluster. A value of "s(i)" that is near zero means that the value is disposed on a border between two clusters 128.

An average value of "s(i)" over each of the items in the cluster 128 is a measure of how tightly grouped the items are in relation to each other, and thus accuracy of the clustering by the clustering module 126. If there are too many or too few clusters, 128 such as in an instance in which a value chosen for "k" in K-means clustering is chosen, some clusters 128 may display narrower silhouettes, when graphically plotted, than silhouettes of other clusters. Thus, silhouette plots and averages may be used to determine a number of clusters within the descriptive data 208 that is appropriate by the clustering module 126. The optimal number of clusters determined by Silhouette technique is used for K-means clustering by the clustering module 126. Other clustering techniques are also contemplated, such as Hierarchical clustering or Fuzzy clustering.

The latent classes 204 generated by the clustering module 126 are then employed by a conversion module 218 to convert the categorical data 108 into numerical data 124 (block 308). Continuing with the above example, each cluster 128 represents a respective latent class 204, which are assigned a respective numerical value by the conversion module 218. These numerical values (one for each cluster) are then used by the conversion module 218 to convert the categorical variables of the categorical data 108 into numerical data 124 based on membership of classes within respective clusters.

Thus, the clusters 128 form a number of latent classes 204 that is smaller than the number of classes in the categorical data 108. This number of latent classes 204, however, still conveys information within the numerical data 124 from the categorical data 108 that is useful as part of machine learning. This is contrasted with sparse data of conventional conversion techniques that has limited utility due to errors introduce by noise and random chance, due to the curse of dimensionality resulting from the creation of large number of new dummy variables when converting categorical variables to numerical types using conventional techniques. Accordingly, the numerical data 124 generated by the data transformation module 122 is in a form that is acceptable for processing by the machine learning module 118 and corresponding model 120. In the example of FIG. 2, this is used to train the model 120 as part of machine learning using a loss function 220.

As previously described, the model 120 refers to a computer representation that can be tuned (e.g., trained) by the machine learning module 118 based on inputs to approximate unknown functions. The model 120, for instance, may utilize machine learning to learn from, and make predictions on, training data by analyzing the training data to learn to generate outputs that reflect patterns and attributes of the training data. Examples of machine learning include, but are not limited to, support vector machines, linear regression, logistic regression, dimensionality reduction algorithms, artificial neural networks, deep learning, Poisson regression, linear discriminant analysis (LDA), and so forth. Thus, a machine-learning model 120 makes high-level abstractions in data by generating data-driven predictions or decisions.

To train the model 120, the machine learning module 118 first obtains training data (e.g., the categorical data 108 in this example) that mimics data to be subsequently processed to perform an action as well as a corresponding "correct" training output. The machine learning module 118, for instance, may employ the model 120 to make training predictions based on the training data to identify and analyze various features (at different levels of abstraction) within the training data.

By analyzing features of the training data (e.g., at various levels of abstraction or depths within levels of a neural network) the machine learning module 118 may generate predictions. To verify accuracy of the predictions, the machine learning module 118 compares data that describes a "correct" output received as part of the training data with the generated predictions. A difference between the "correct" output and the generated prediction is then determined by utilizing a loss function 220 to determine a measure of loss, i.e., a measure of difference, such as mean squared error or mean absolute loss. Accordingly, the loss function 220 is used to determine a measure of divergence of the prediction from a desired result. A result from the loss function 220 is then used to train the model 120, such as to correct parameters (e.g., weights) that caused the predicted result to diverge from the actual result to modify one or more functions or parameters. Specifically, the machine learning module 118 modifies one or more functions or parameters of the model 120 to minimize the loss function 220 and reduce the differences between the predictions and the correct output as specified by the training data. By minimizing the loss function 220, the machine learning module 118 improves the accuracy of the model 120 over a number of training samples.

FIG. 4 depicts an example system 400 showing use of the model 120 trained as described in relation to FIGS. 2 and 3. In this example, user data 110 is received that includes categorical data 108. As before, the categorical data 108 includes a categorical variable having a non-numerical data type for a number of classes (block 502), e.g., a geographic location like city, state, and so forth that is described using alphabetic text.

The conversion module 218 then leverages the clusters 128 and latent classes 204 to convert the non-numerical data type of the categorical variable into numerical data by assigning the non-numeric data type to a respective latent class of a plurality of latent classes (block 504). Continuing with the previous example, clusters 128 may be generated from the descriptive data 208 to form latent classes 204 of similar classes of a categorical variable, such as cites for "place of residence." Accordingly, the conversion module 218 is configured to input a class of a categorical variable and from the clusters 128 determine to which cluster 128 the class belongs, e.g., which cluster includes the city "San Jose." The conversion module 218 then determines which numerical value is assigned to that cluster 128, and uses this value to convert the categorical data 108 into numerical data 124.

The numerical data is then processed using a machine learning module (block 506) and a result of the processing is output (block 508). This result may be leveraged in a variety of ways, such as to control output of digital content 112 by a digital content control module 114 to a client device 104 associated with the user. In a digital marketing scenario, for instance, digital marketing content is provided to the client devices 104 in order to increase a likelihood that users of the client devices 104 will interact with the content or another item of digital marketing content toward purchase of a product or service, which is also referred to as conversion.

In one example of use of digital marketing content and conversion, a user may navigate through webpages of a website of a service provider. During this navigation, the user of the client device 104 is exposed to advertisements relating to the good or service. If the advertisements are of interest to the user of the client device 104, the user may select the advertisement via the client device 104 to navigate to webpages that contain more information about the product or service that is a subject of the advertisement, functionality usable to purchase the good or service, and so forth. Each of these selections thus involves conversion of interaction of the user with respective digital marketing content into other interactions with other digital marketing content and/or even purchase of the good or service. Thus, configuration of the advertisements in a manner that is likely to be of interest to the users increases the likelihood of conversion of the users regarding the product or service. Other examples are also contemplated, such as to form recommendations, guide navigation, and so forth.

Figure 6:
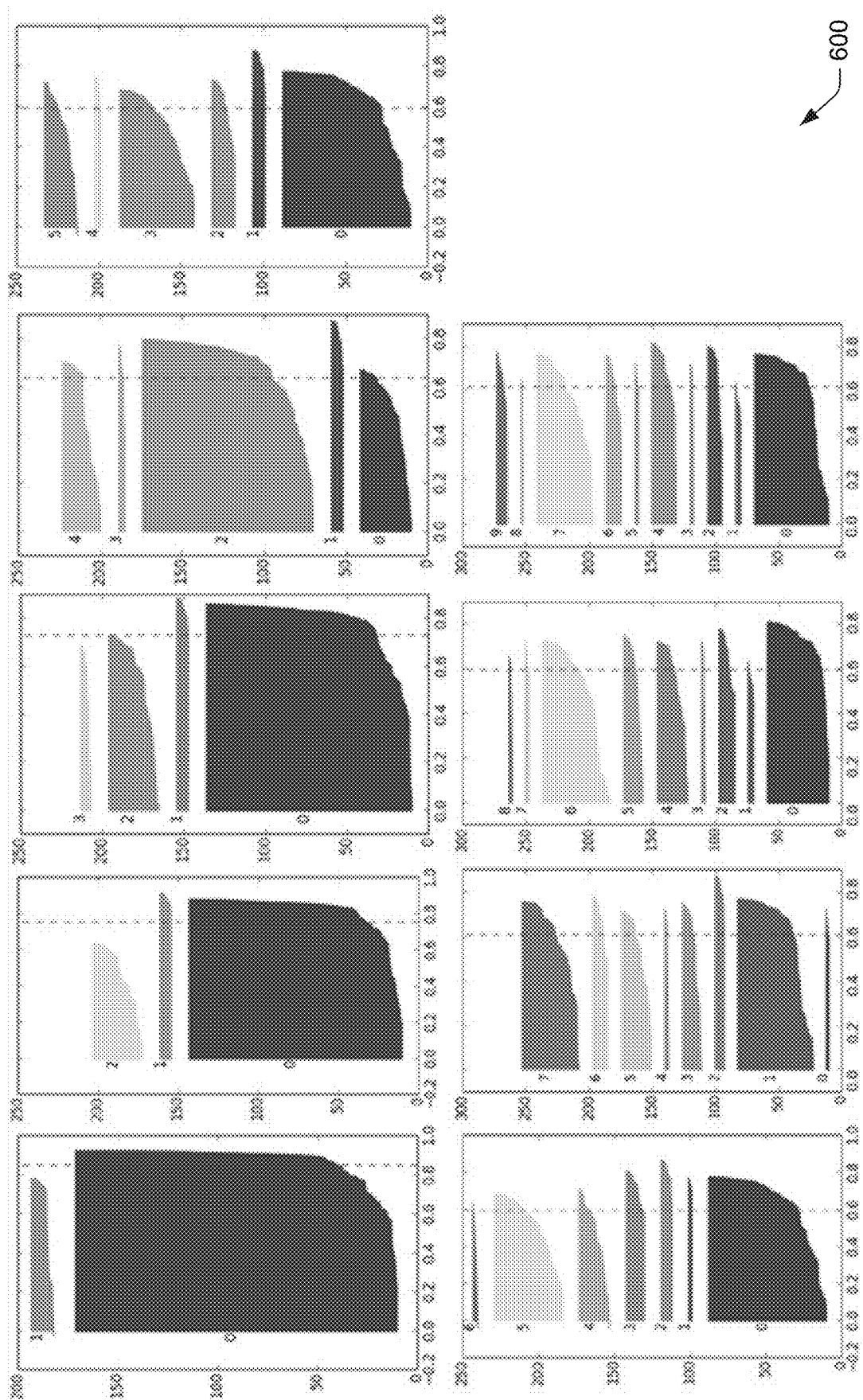

FIG. 6 depicts a first example 600 of clustering for a categorical variable "Country of Residence." For this categorical variable, there are at least 175 different classes, i.e., different countries. Accordingly, in conventional techniques this would require creation of 175 dummy variables that would lead to high dimensional data and hence to a "curse of dimensionality" as described above. Here, clustering is employed by the data transformation module 122 to forms clusters 128. The data transformation module 122, for instance, may perform a web scrape of a data repository system 212 "www.worldbank.com." The seven features that were extracted in this example include population, birth rate, mortality rate, life expectancy, death rate, surface are, and forest area. These features are first normalized and then K-means clustering is performed, with a range of K from two to ten. Based of the Silhouette plots of FIG. 6, this techniques performs well and has good separate with K equal to eight.

In this example, the features are not limited to a particular type, such as just economic or just physical features. This supports numerous advantages in that the clusters formed are more meaningful as these clusters represent higher variation of data. For example, if the only feature was country size then the clustering technique would cluster countries with similar sizes to form the latent classes. However, by using different types of features, the techniques described herein may find clusters of countries having both similar sizes and similar populations. For example, large countries with small populations could be clustered together, with another cluster used to define small countries having large populations based on the overall similarity of the features used as a basis to form the clusters.

Figure 7:
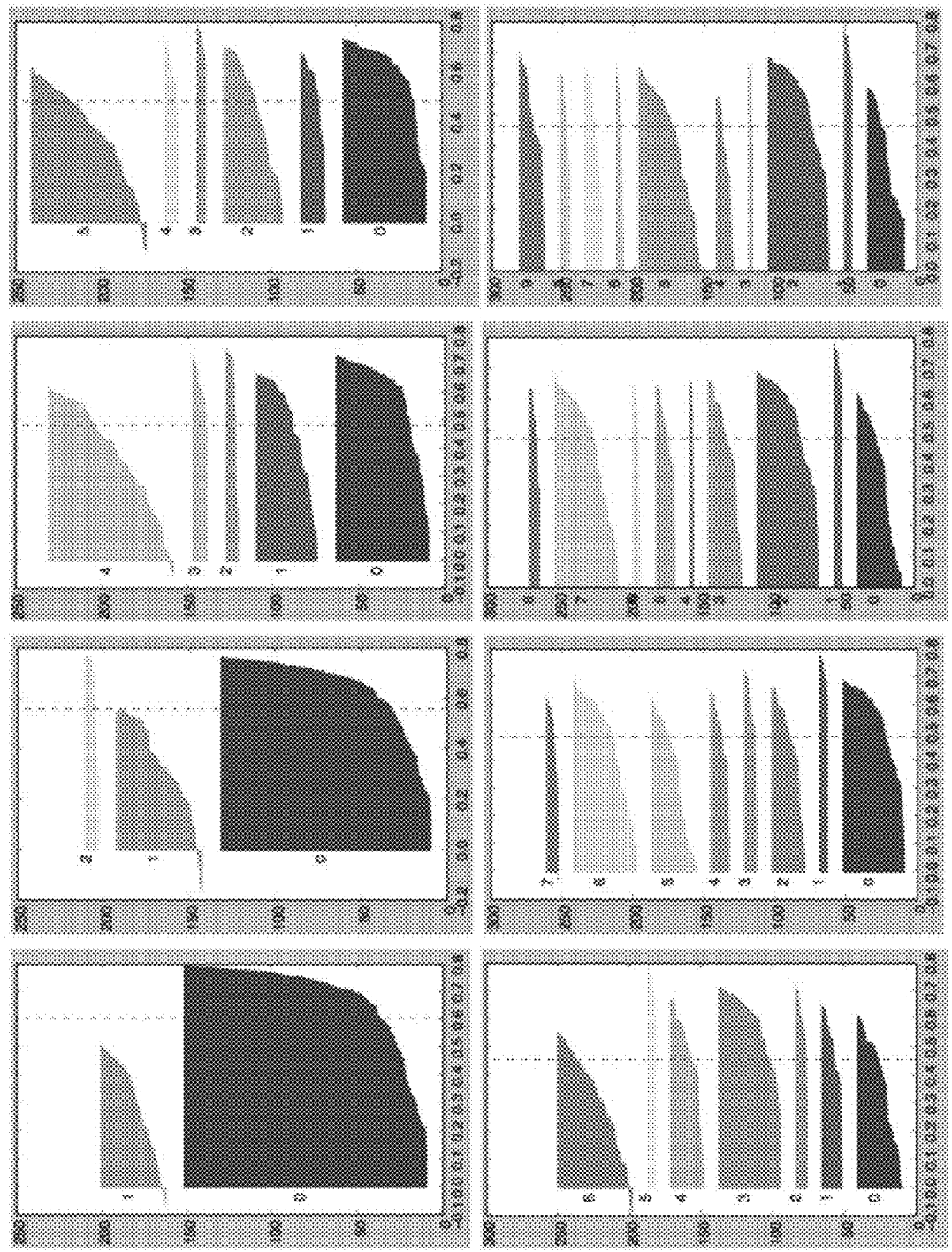

FIG. 7 depicts a second example 700 of clustering for a categorical variable "City of Residence." To obtain descriptive data 208 in this example, webpages of the website Wikipedia® were scraped, and more particularly from the info box on the webpages that contain quick facts about the article. This was performed for 183 U.S. cities, with K-means clustering performed like the previous example to group similar cities together to generate the clusters 128. Thus, in this example the features may be set automatically by the data repository system 212, which are land area, water area, elevation, population, and population density. This shows that despite having a categorical variable with many classes and no on-hand information about the classes, descriptive data 208 may be extracted from a data repository system 212 to generate the clusters 128 and respective latent classes 204.

Figure 8:
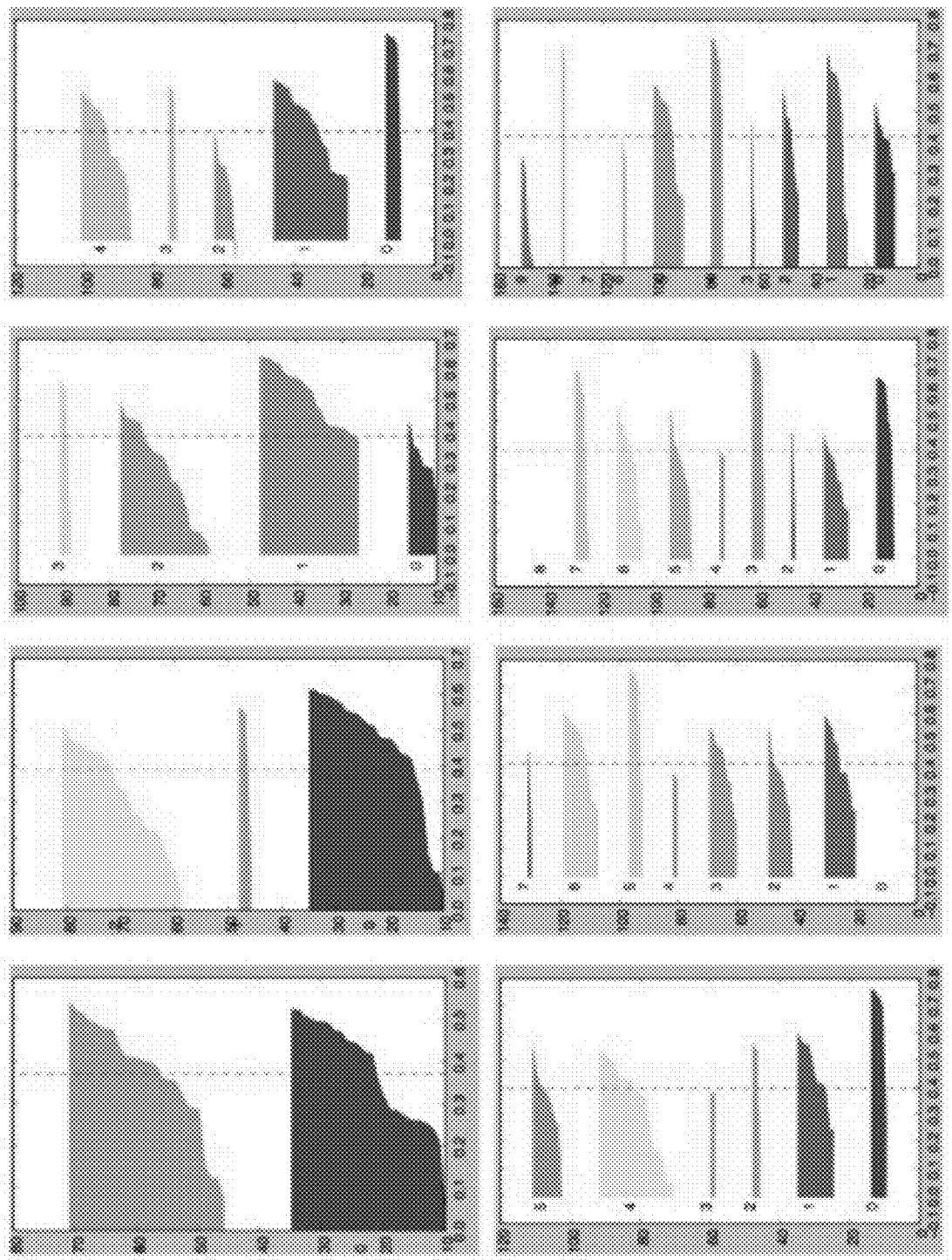

FIGS. 8 and 9 depicts a third example 800, 900 of clustering for a categorical variable "vegetable." In this example, web scraping was performed using Wikipedia® for a list of 52 vegetables to extract features. The features that were extracted based on the web scraping include calories, protein, carbohydrates, and dietary fiber. Thus, the practicality and efficiency of web scraping is again shown as a technique to automatically collect features to build a set of descriptive data 208 as a basis to form clusters 128. FIG. 9 depicts examples of first, second, third, fourth, fifth, and sixth cluster 902, 904, 906, 908, 910, 912 The clustering of vegetables demonstrates the wide variety of variable types, to which, the techniques described herein may be applied.

Example System and Device

Figure 10:
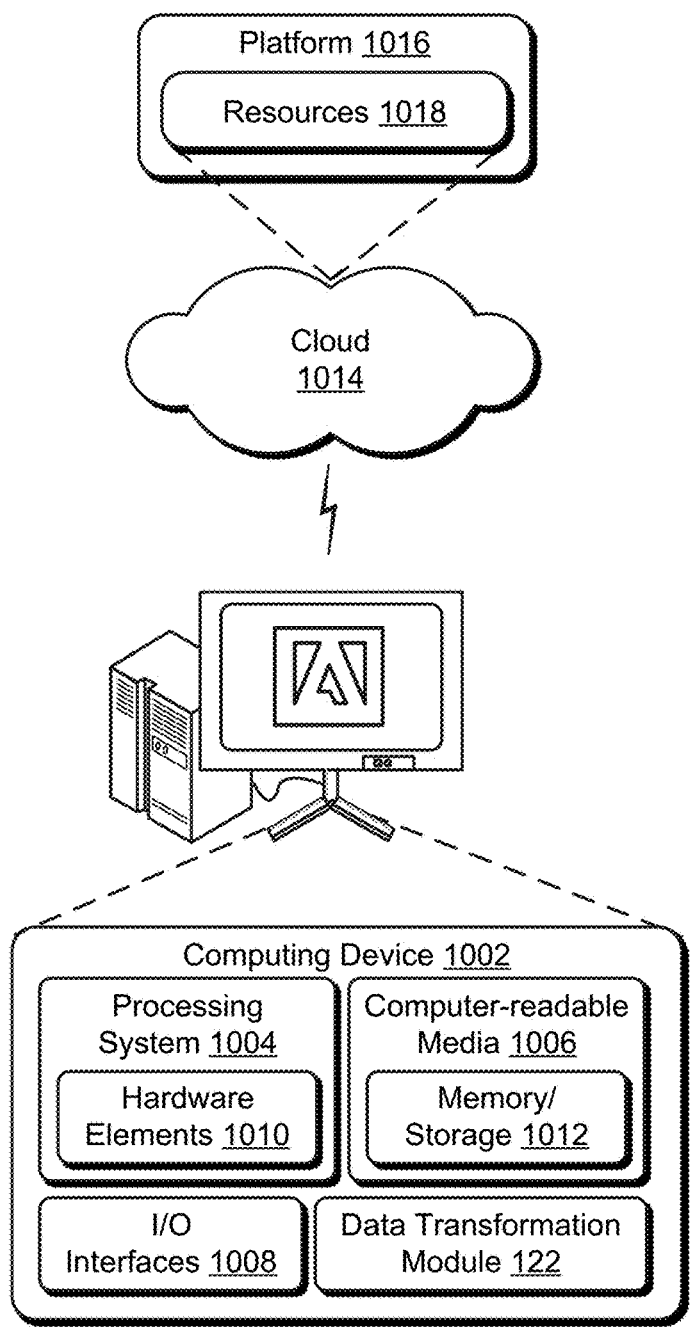
FIG. 10 illustrates an example system including various components of an example device that can be implemented as any type of computing device as described and/or utilize with reference to FIGS. 1-9 to implement embodiments of the techniques described herein.

FIG. 10 illustrates an example system generally at 1000 that includes an example computing device 1002 that is representative of one or more computing systems and/or devices that may implement the various techniques described herein. This is illustrated through inclusion of the data transformation module 122. The computing device 1002 may be, for example, a server of a service provider, a device associated with a client (e.g., a client device), an on-chip system, and/or any other suitable computing device or computing system.

The example computing device 1002 as illustrated includes a processing system 1004, one or more computer-readable media 1006, and one or more I/O interface 1008 that are communicatively coupled, one to another. Although not shown, the computing device 1002 may further include a system bus or other data and command transfer system that couples the various components, one to another. A system bus can include any one or combination of different bus structures, such as a memory bus or memory controller, a peripheral bus, a universal serial bus, and/or a processor or local bus that utilizes any of a variety of bus architectures. A variety of other examples are also contemplated, such as control and data lines.

The processing system 1004 is representative of functionality to perform one or more operations using hardware. Accordingly, the processing system 1004 is illustrated as including hardware element 1010 that may be configured as processors, functional blocks, and so forth. This may include implementation in hardware as an application specific integrated circuit or other logic device formed using one or more semiconductors. The hardware elements 1010 are not limited by the materials from which they are formed or the processing mechanisms employed therein. For example, processors may be comprised of semiconductor(s) and/or transistors (e.g., electronic integrated circuits (ICs)). In such a context, processor-executable instructions may be electronically-executable instructions.

The computer-readable storage media 1006 is illustrated as including memory/storage 1012. The memory/storage 1012 represents memory/storage capacity associated with one or more computer-readable media. The memory/storage component 1012 may include volatile media (such as random access memory (RAM)) and/or nonvolatile media (such as read only memory (ROM), Flash memory, optical disks, magnetic disks, and so forth). The memory/storage component 1012 may include fixed media (e.g., RAM, ROM, a fixed hard drive, and so on) as well as removable media (e.g., Flash memory, a removable hard drive, an optical disc, and so forth). The computer-readable media 1006 may be configured in a variety of other ways as further described below.

Input/output interface(s) 1008 are representative of functionality to allow a user to enter commands and information to computing device 1002, and also allow information to be presented to the user and/or other components or devices using various input/output devices. Examples of input devices include a keyboard, a cursor control device (e.g., a mouse), a microphone, a scanner, touch functionality (e.g., capacitive or other sensors that are configured to detect physical touch), a camera (e.g., which may employ visible or non-visible wavelengths such as infrared frequencies to recognize movement as gestures that do not involve touch), and so forth. Examples of output devices include a display device (e.g., a monitor or projector), speakers, a printer, a network card, tactile-response device, and so forth. Thus, the computing device 1002 may be configured in a variety of ways as further described below to support user interaction.

Various techniques may be described herein in the general context of software, hardware elements, or program modules. Generally, such modules include routines, programs, objects, elements, components, data structures, and so forth that perform particular tasks or implement particular abstract data types. The terms "module," "functionality," and "component" as used herein generally represent software, firmware, hardware, or a combination thereof. The features of the techniques described herein are platform-independent, meaning that the techniques may be implemented on a variety of commercial computing platforms having a variety of processors.

An implementation of the described modules and techniques may be stored on or transmitted across some form of computer-readable media. The computer-readable media may include a variety of media that may be accessed by the computing device 1002. By way of example, and not limitation, computer-readable media may include "computer-readable storage media" and "computer-readable signal media."

"Computer-readable storage media" may refer to media and/or devices that enable persistent and/or non-transitory storage of information in contrast to mere signal transmission, carrier waves, or signals per se. Thus, computer-readable storage media refers to non-signal bearing media. The computer-readable storage media includes hardware such as volatile and non-volatile, removable and non-removable media and/or storage devices implemented in a method or technology suitable for storage of information such as computer readable instructions, data structures, program modules, logic elements/circuits, or other data. Examples of computer-readable storage media may include, but are not limited to, RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and which may be accessed by a computer.

"Computer-readable signal media" may refer to a signal-bearing medium that is configured to transmit instructions to the hardware of the computing device 1002, such as via a network. Signal media typically may embody computer readable instructions, data structures, program modules, or other data in a modulated data signal, such as carrier waves, data signals, or other transport mechanism. Signal media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media.

As previously described, hardware elements 1010 and computer-readable media 1006 are representative of modules, programmable device logic and/or fixed device logic implemented in a hardware form that may be employed in some embodiments to implement at least some aspects of the techniques described herein, such as to perform one or more instructions. Hardware may include components of an integrated circuit or on-chip system, an application-specific integrated circuit (ASIC), a field-programmable gate array (FPGA), a complex programmable logic device (CPLD), and other implementations in silicon or other hardware. In this context, hardware may operate as a processing device that performs program tasks defined by instructions and/or logic embodied by the hardware as well as a hardware utilized to store instructions for execution, e.g., the computer-readable storage media described previously.

Combinations of the foregoing may also be employed to implement various techniques described herein. Accordingly, software, hardware, or executable modules may be implemented as one or more instructions and/or logic embodied on some form of computer-readable storage media and/or by one or more hardware elements 1010. The computing device 1002 may be configured to implement particular instructions and/or functions corresponding to the software and/or hardware modules. Accordingly, implementation of a module that is executable by the computing device 1002 as software may be achieved at least partially in hardware, e.g., through use of computer-readable storage media and/or hardware elements 1010 of the processing system 1004. The instructions and/or functions may be executable/operable by one or more articles of manufacture (for example, one or more computing devices 1002 and/or processing systems 1004) to implement techniques, modules, and examples described herein.

The techniques described herein may be supported by various configurations of the computing device 1002 and are not limited to the specific examples of the techniques described herein. This functionality may also be implemented all or in part through use of a distributed system, such as over a "cloud" 1014 via a platform 1016 as described below.

The cloud 1014 includes and/or is representative of a platform 1016 for resources 1018. The platform 1016 abstracts underlying functionality of hardware (e.g., servers) and software resources of the cloud 1014. The resources 1018 may include applications and/or data that can be utilized while computer processing is executed on servers that are remote from the computing device 1002. Resources 1018 can also include services provided over the Internet and/or through a subscriber network, such as a cellular or Wi-Fi network.

The platform 1016 may abstract resources and functions to connect the computing device 1002 with other computing devices. The platform 1016 may also serve to abstract scaling of resources to provide a corresponding level of scale to encountered demand for the resources 1018 that are implemented via the platform 1016. Accordingly, in an interconnected device embodiment, implementation of functionality described herein may be distributed throughout the system 1000. For example, the functionality may be implemented in part on the computing device 1002 as well as via the platform 1016 that abstracts the functionality of the cloud 1014.

CONCLUSION

Although the invention has been described in language specific to structural features and/or methodological acts, it is to be understood that the invention defined in the appended claims is not necessarily limited to the specific features or acts described. Rather, the specific features and acts are disclosed as example forms of implementing the claimed invention.

What is claimed is:

1. In a digital medium environment to improve operation of a computing device to perform machine learning using non-numerical data, a method implemented by the computing device, the method comprising:
   receiving, by the computing device via a network, categorical data that includes a categorical variable having a non-numerical data type for a plurality of classes;
   obtaining, by the computing device via the network, descriptive data describing features of each class included in the plurality of classes;
   determining, by the computing device using a Silhouette clustering technique, a number of clusters that is smaller than a number of classes included in the plurality of classes and the number of classes is ten or more;
   generating, by the computing device, a plurality of latent classes by clustering the features of each class included in the plurality of classes into the number of clusters;
   converting, by the computing device, the categorical data into numerical data based on the plurality of latent classes; and
   training, by the computing device, a model using machine learning using the numerical data, the numerical data including information from the categorical data.

2. The method as described in claim 1, wherein the obtaining includes forming a search request of a data repository system via the network based on the plurality of classes and receiving the descriptive data as a search result responsive to a search performed of the data repository system based on the search request.

3. The method as described in claim 1, further comprising receiving, by the computing device, a user input specifying the features of each class included in the plurality of classes and the obtaining of the descriptive data is performed based on the the user input.

4. The method as described in claim 1, wherein the clustering uses a K-means clustering technique.

5. The method as described in claim 1, wherein the Silhouette clustering technique is based on a measure of:
   cohesion indicating similarity of numerical values; and
   separation indicating dissimilarity of the numerical values.

6. The method as described in claim 1, wherein the converting includes assigning numerical values to the plurality of classes based on membership of the features of each class of the plurality of classes within clusters included in the number of clusters.

7. The method as described in claim 1, wherein a number of the plurality of latent classes is less than ten.

8. The method as described in claim 1, wherein the categorical variable is a geographic location.

9. In a digital medium environment to improve operation of a computing device to enable the computing device to perform machine learning using non-numerical data, a system comprising:
   an input module implemented at least partially in hardware of a computing device to receive categorical data via a network that includes a categorical variable having a non-numerical data type for a plurality of classes;
   a descriptive data location module implemented at least partially in the hardware of the computing device to obtain descriptive data describing features of each class included in the plurality of classes and a number of classes included in the plurality of classes is ten or more;
   a conversion module implemented at least partially in the hardware of the computing device to convert the non-numerical data type of the categorical variable into numerical data by assigning the non-numerical data type to a respective latent class of a plurality of latent classes, the plurality of latent classes based on clusters formed of the descriptive data using a Silhouette clustering technique; and
   a machine learning module implemented at least partially in the hardware of the computing device to process the numerical data by a model using machine learning and output a result of the processing of the latent classes by the model using machine learning, the numerical data including information from the categorical data.

10. The system as described in claim 9, wherein the descriptive data is obtained by forming a search request of a data repository system via the network based on the categorical variable and receiving the descriptive data as a search result in response to a search performed of the data repository system based on the search request.

11. The system as described in claim 9, wherein the Silhouette clustering technique includes a K-means clustering technique.

12. The system as described in claim 9, wherein a number of latent classes included in the plurality of latent classes is less than ten.

13. The system as described in claim 9, wherein the result is a digital content recommendation.

14. The system as described in claim 9, wherein the result is digital content.

15. One or more non-transitory computer-readable storage media comprising instructions stored thereon that, responsive to execution by a computing device in a digital medium environment, cause operations of the computing device including:
   receiving, via a network, categorical data that includes a categorical variable having a non-numerical data type for a plurality of classes;
   obtaining, via the network, descriptive data describing features of each class included in the plurality of classes;
   determining, using a Silhouette clustering technique, a number of clusters that is smaller than a number of classes included in the plurality of classes and the number of classes is ten or more;
   generating a plurality of latent classes by clustering the features of each class included in the plurality of classes into the number of clusters;
   converting the categorical data into numerical data based on the plurality of latent classes; and training a model using machine learning using the numerical data, the numerical data including information from the categorical data.

16. The one or more non-transitory computer-readable storage media as described in claim 15, the operations further including receiving a user input specifying the features of each class included in the plurality of classes and the obtaining of the descriptive data is performed based on the the user input.

17. The one or more non-transitory computer-readable storage media as described in claim 15, wherein the clustering uses a K-means clustering technique.

18. The one or more non-transitory computer-readable storage media as described in claim 15, wherein the number of clusters is less than ten.

19. The one or more non-transitory computer-readable storage media as described in claim 15, wherein the categorical variable is a geographic location.

20. The one or more non-transitory computer-readable storage media as described in claim 15, wherein the Silhouette clustering technique is based on:
cohesion indicating similarity of numerical values; and
separation indicating dissimilarity of the numerical values.

* * * * *

UNITED STATES PATENT AND TRADEMARK OFFICE
CERTIFICATE OF CORRECTION

PATENT NO. : 11,036,811 B2
APPLICATION NO. : 15/923839
DATED : June 15, 2021
INVENTOR(S) : Modarresi et al.

Page 1 of 1

It is certified that error appears in the above-identified patent and that said Letters Patent is hereby corrected as shown below:

In the Claims

Column 15, Line 51, after "performed based on", delete "the", therefor.

Column 17, Line 9, after "performed based on", delete "the", therefor.

Signed and Sealed this
Tenth Day of August, 2021

Drew Hirshfeld
*Performing the Functions and Duties of the
Under Secretary of Commerce for Intellectual Property and
Director of the United States Patent and Trademark Office*